United States Patent [19]
Erwin

[11] Patent Number: 5,626,331
[45] Date of Patent: May 6, 1997

[54] COMPOSITE SPINDLE

[75] Inventor: Ronald D. Erwin, Fayetteville, Ga.

[73] Assignee: Erwin Industries, Inc., Peachtree City, Ga.

[21] Appl. No.: 582,312

[22] Filed: Jan. 3, 1996

[51] Int. Cl.$^6$ .................................................. E04F 11/18
[52] U.S. Cl. ........................... 256/59; 256/19; 256/DIG. 5
[58] Field of Search ................................. 256/19, DIG. 5, 256/59; 264/275; 249/143

[56] References Cited

U.S. PATENT DOCUMENTS

| | | | |
|---|---|---|---|
| 3,957,250 | 5/1976 | Murphy | 256/19 |
| 3,991,146 | 11/1976 | Barrie | 264/275 X |
| 4,186,162 | 1/1980 | Daley | 264/275 X |
| 4,285,902 | 8/1981 | Braverman | 264/275 X |
| 4,753,719 | 6/1988 | Yamaguchi et al. | 264/275 X |
| 4,777,977 | 10/1988 | Platusich | 264/275 X |
| 4,858,891 | 8/1989 | Boes | 256/19 |
| 5,035,401 | 7/1991 | Solter | 256/19 |
| 5,161,784 | 11/1992 | Sader | 256/19 |
| 5,370,368 | 12/1994 | Terrels et al. | 256/19 |

FOREIGN PATENT DOCUMENTS 1091759  4/1955  France ..................................... 256/19

Primary Examiner—Anthony Knight
Attorney, Agent, or Firm—Arthur A. Gardner & Associates

[57] ABSTRACT

A spindle or baluster for use in a fence or deck railing which comprises a plastic outer shell having a first end section, a second end section opposite the first end section, and a middle section intermediate the first and second end sections. An elongate metal reinforcing element is positioned within the outer shell and extends from the first end section to the second end section. A rigid plastic foam is disposed within at least a portion of the first and second end sections and substantially surrounds portions of the metal reinforcing element.

8 Claims, 1 Drawing Sheet

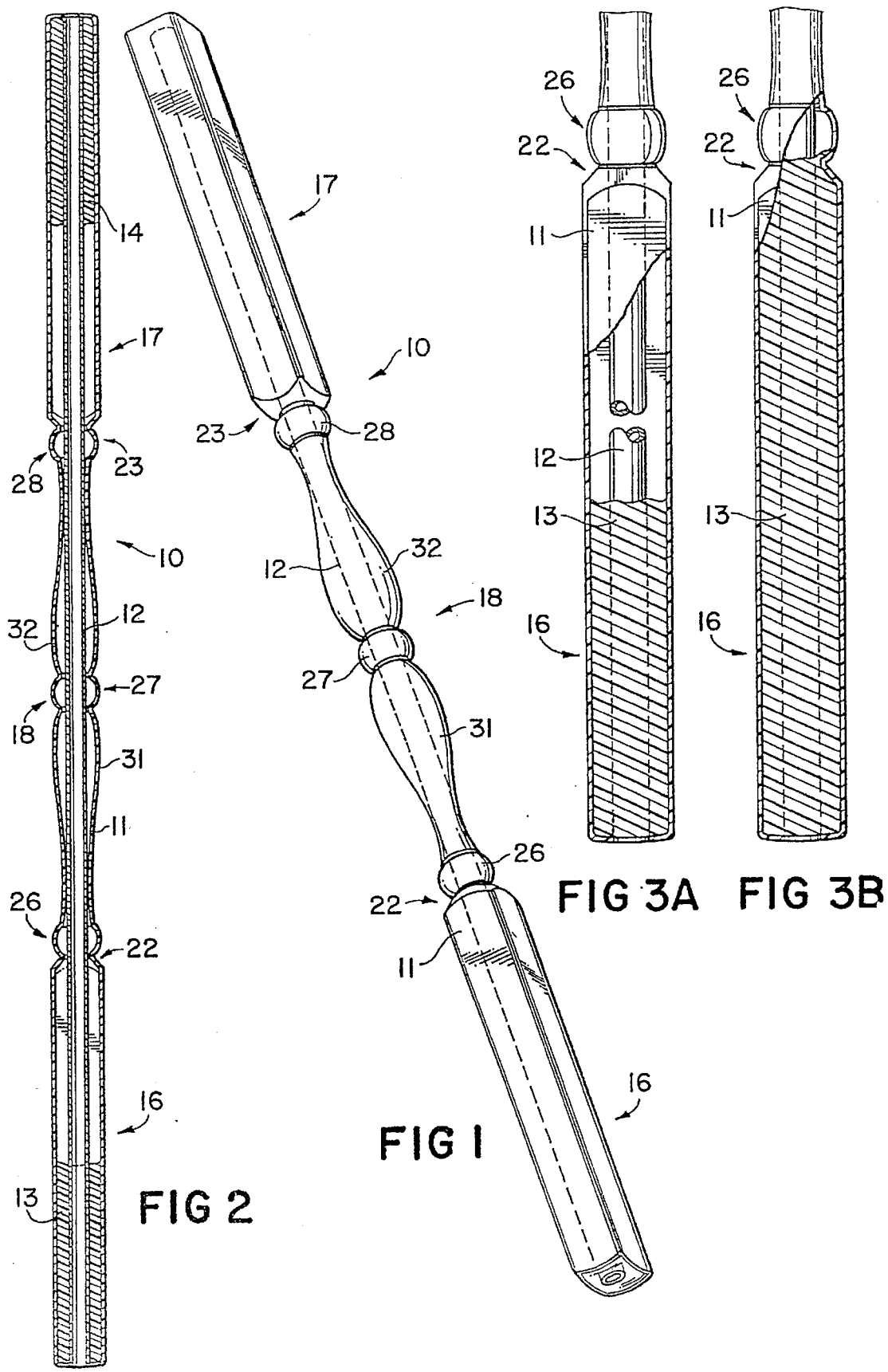

COMPOSITE SPINDLE

TECHNICAL FIELD

The present invention is directed to decking and fencing products, and in particular to spindles and balusters for decking and fencing.

BACKGROUND OF THE INVENTION

Outdoor decks and fences are extremely popular in residential home construction. Homes and apartments, as well as a variety of other buildings, often incorporate exterior decks and fences into their design. Additionally, decks and fences are commonly added onto existing structures and landscapes. These decks and fences provide convenient spaces for a variety of outdoor activities, including cookouts, dining and sunbathing, as well as other leisure activities. Moreover, decks typically are provided with a railing or perimeter fence to keep people from falling over the edge of the deck.

Wood products have traditionally been the primary source of materials for use in decking construction. However, wood products are becoming increasingly scarce due to the harvesting of trees at ever faster rates and the rather limited rate at which timber resources can be replenished. Also, environmental concerns and regulations directed to conservation or preservation of forests tend to restrict the availability of wood products. With the diminishing availability of timber resources, wood products are becoming increasingly expensive. There is, therefore, a substantial need for long lasting substitute construction materials that can lessen the need to harvest timber resources.

One potential approach to addressing the above need is to provide substitute decking and fencing products made of plastic, rather than wood. However, because the deck and fencing products must be capable of sustaining certain roads, the replacement products need to be stable and rigid. The material should also be capable of economical manufacture, and be relatively inexpensive. It also needs to be easily fabricated and used in the field.

A variety of plastic building products are known. For example, U.S. Pat. No. 4,045,603 describes a three-layer synthetic construction material made from recycled waste thermoplastic synthetic resin material and cellulose fiber aggregate. This material includes face surfaces consisting essentially of re-hardened fused and rolled thermoplastic synthetic resin material bits, and an intervening core material consisting essentially of a compressed non-homogenous mixture of cellulose aggregate material bits and re-hardened fused thermoplastic synthetic resin material bits.

U.S. Pat. No. 3,764,245 describes an apparatus for producing a light structural board of thermoplastic resin.

U.S. Pat. No. 5,253,458 describes a simulated log made from a cast polyvinylchloride (PVC) pipe, selectively filled with a hard cast foam or bead type foam. This patent further describes that the cast PVC pipe is first manufactured and then subsequently filled with the foam filler.

Accordingly, it can be seen there is a need yet in the art for replacement decking and fence components as a replacement for traditional wood products, which provide a strong finished product at minimal cost, which are weather resistant and which can be produced easily. It to the provision of such decking and fence components that the present invention is primarily directed.

SUMMARY OF THE INVENTION

Briefly described, in a preferred form the present invention comprises a spindle or baluster for use in a fence or deck railing. The spindle comprises a plastic outer shell having a first end section, a second end section opposite the first end section, and a middle section intermediate the first and second end sections. An elongate metal reinforcing element is disposed within the outer shell and extends from the first end section to the second end section. Rigid plastic foam is disposed within at least a portion of the first and second end sections of the shell and at least substantially surrounds portions of the metal reinforcing element. Preferably, the plastic foam is injected into the end sections as a liquid and expands to substantially fill the entire end sections of the shell. Also preferably, the metal reinforcing element is hollow and has an outside transverse dimension which is closely matched to an internal transverse dimension of the intermediate section of the shell.

With this construction, a composite spindle or baluster is provided which is very easy to manufacture, which provides excellent appearance, and which provides good strength (both in terms of bending resistance and compression load carrying capability). This composite material represents a good alternative to the use of traditional wood spindles and balusters.

Accordingly, it is an object of the present invention to provide a composite spindle or baluster which is economical in manufacture and application, durable in construction, and simple.

It is another object of the invention to provide a composite spindle or baluster which has good strength and rigidity for use in fencing and deck railings.

It is yet another object of the present invention to provide a composite spindle or baluster which, while having the general appearance of a traditional wood spindle or baluster, does not rely on scarce timber resources and which is highly resistant to weathering.

These and other objects, advantages, and features of the present invention will become more apparent upon reading the following specification in conjunction with the accompanying drawing figures.

BRIEF DESCRIPTION OF THE DRAWING FIGURES

FIG. 1 is a perspective illustration of a spindle or baluster according to a preferred form of the invention.

FIG. 2 is a sectional illustration of the spindle or baluster of FIG. 1.

FIG. 3A is a partially cut-away illustration of a portion of the spindle or baluster of FIG. 1.

FIG. 3B is a partially cut-away illustration of a portion of the spindle or baluster of FIG. 1 in a second preferred form of the invention.

DETAILED DESCRIPTION OF THE PREFERRED EMBODIMENTS

Referring now to the drawing figures, wherein like reference numerals depict like parts throughout the several views, FIGS. 1 and 2 show a composite spindle 10 according to a preferred form of the invention. The composite spindle 10 generally comprises a rigid plastic outer shell 11, a steel tubular reinforcing element 12, and high density polyurethane foam 13 and 14 for securing the steel tubular reinforcing element 12 within the PVC outer shell 11.

The PVC outer shell 11 includes a first end section 16, a second end section 17 opposite the first end section 16, and an intermediate section 18 between the first and second end sections. Each of the end sections 16, 17 is square in cross-section over substantially their entire lengths, with a transition region 22, 23 easing the transition between the square cross-section of the end sections 16, 17 and the "turned" profile of the intermediate section 18. In this regard, the overall visual effect of the spindle is that of a traditional, wooden spindle which, while initially square in cross-section along its entire length, is formed by turning it on a lathe to produce the rounded shapes in the intermediate section, such as the rounded shapes depicted in FIGS. 1 and 2.

For illustration purposes, FIGS. 1 and 2 depict an intermediate section having certain design elements common to turned wooden posts or spindles. For example, as depicted in FIGS. 1 and 2, the intermediate section includes three bulbous transition elements 26, 27 and 28. A pair of club shaped or bat shaped surfaces 31 and 32 extend between the bulbous transition elements 26 and 27 and 27 and 28, respectively. Of course, other shapes are possible.

As can be seen in FIGS. 1 and 2, the outside diameter of the steel tubular reinforcing element 12 is closely matched to the internal transverse dimension or inside diameter of the PVC outer shell 11 at certain locations, namely at the places where the bulbous transition elements 26 and 28 meet the transition regions 22 and 23, respectively. Also, at the edges of the bulbous transition element 27 the internal transverse dimension or internal diameter of the PVC outer shell 11 is closely matched to the outside diameter of the steel tubular reinforcing element 12.

Preferably, the steel tubular reinforcing element 12 has a 0.625" outside diameter and wall thickness of 16 guage. Also preferably, the high density polyurethane foam 13, 14 in the end sections 16, 17 is of a 6 to 16 lbs. density.

To manufacture and assemble the composite spindle, the PVC outer shell is first blow molded and then the steel tubular reinforcing element 12 is inserted in through one end of the PVC shell towards the other end thereof. With the steel tubing in place, liquid polyurethane foam is then injected into the end sections 16, 17 and allowed to cure. Alternatively, the steel tubular reinforcing element 12 can be placed in the mold prior to forming the PVC outer shell. A third manufacturing option would be to make the empty shell 11 first, then fill it with foam in the ends 16 and 17 thereof, and then to force the tubular reinforcing element through the foam at one end of the composite spindle and ram it into the other end thereof.

As depicted in FIG. 2 and FIG. 3A, the polyurethane foam injected into the end sections 16 and 17 of the PVC outer shell 11 can be injected at a controlled rate and in a controlled amount to control or limit the amount or extent of the filling of the end sections 16 and 17 with polyurethane foam. A depicted in FIGS. 2 and 3A, sufficient amounts of high density polyurethane foam can be injected into the interior of the end sections 16 and 17 to ensure adequate securement of the steel tubular reinforcing element within the PVC outer shell. Alternatively, as depicted in FIG. 3B, additional liquid polyurethane foam can be added to the end sections 16 and 17 to fill the end sections 16 and 17 substantially completely with polyurethane foam. Indeed, as depicted in FIG. 3B, a small amount of the polyurethane foam can be allowed to escape beyond the end sections 16 and 17 and into the intermediate section 18. FIGS. 3A and 3B depict that the high density foam can be used to fill the end sections only half way (FIG. 3A) or entirely (FIG. 3B).

The resulting composite spindle has the appearance of a turned wooden spindle, without the attendant demand on timber resources for producing such. Moreover, the cost of manufacturing such a composite spindle is quite reasonable. Also, by the combination of the plastic outer shell, the shell reinforcing element, and the high density polyurethane foam, a strong, stiff spindle is achieved. The composite spindle constructed this way meets typical building code requirements for strength. Such building code requirement typically are not met by producing a hollow spindle of a similar shape made out of PVC, for example. This composite spindle is quite weather resistant, owing to the external surfaces being made of PVC, while the less weatherable element (the steel) is concealed therewithin.

While the invention has been disclosed in preferred forms, it will be apparent to those skilled in the art that certain modifications, additions, and deletions can be made therein without departing from the spirit and scope of the invention as set forth in the appended claims. For example, other plastic materials can be used for the shell besides PVC. Likewise, instead of using a polyurethane foam, some other foam could be used to provide additional rigidity and stiffness and to secure the steel reinforcing element within the end sections of the outer shell. Also, the intermediate section or center section of the spindle can take various shapes, as desired. Also, the steel reinforcing tube can be replaced with a solid steel reinforcing rod. These and other modifications, nonetheless, fall within the scope of the invention as set forth in the following claims.

What is claimed is:

1. A spindle for use in a fence or a deck railing and comprising:

a. a plastic outer shell having a first end section, a second end section opposite said first end section, and a middle section intermediate said first and second end sections, said middle section having at least one portion having an internal transverse dimension which is smaller than an internal transverse dimension of each of said first and second end sections;

b. an elongate metal reinforcing element disposed within said outer shell and extending from said first end section to said second end section, wherein said metal reinforcing element contacts said at least one portion of said middle section; and c. a rigid plastic foam disposed within at least a portion of said first and second end sections and at least substantially surrounding portions of said metal reinforcing element.

2. A spindle as claimed in claim 1 wherein said rigid plastic foam substantially fills said first and second end sections.

3. A spindle as claimed in claim 1 wherein said elongate metal reinforcing element is hollow.

4. A spindle as claimed in claim 1 wherein said plastic outer shell is made of PVC.

5. A spindle as claimed in claim 1 wherein said rigid plastic foam comprises a high density polyurethane foam.

6. A spindle as claimed in claim 1 wherein said rigid plastic foam comprises a polyurethane foam which has been injected into said first and second end sections as a liquid and then solidified therein.

7. A spindle as claimed in claim 1 wherein said at least one portion of said middle section comprises at least two portions each having an internal transverse dimension which is smaller than said internal transverse dimension of each of said first and second end sections.

8. A spindle as claimed in claim 1 wherein said middle section is entirely untilled or only partly filled.

* * * * *